June 5, 1923.

E. T. CURRAN 1,457,768

LIQUID COOLING RADIATOR FOR VEHICLES

Filed April 2, 1920

Inventor
Edward T. Curran
By his Attorney

Patented June 5, 1923.

1,457,768

UNITED STATES PATENT OFFICE.

EDWARD T. CURRAN, OF DETROIT, MICHIGAN.

LIQUID-COOLING RADIATOR FOR MOTOR VEHICLES.

Application filed April 2, 1920. Serial No. 370,813.

*To all whom it may concern:*

Be it known that I, EDWARD T. CURRAN, a citizen of the United States, and a resident of Detroit, in the county of Wayne and State of Michigan, have invented certain new and useful Improvements in Liquid-Cooling Radiators for Motor Vehicles, of which the following is a specification.

This invention relates to liquid cooling radiators used in connection with motor vehicles to facilitate the cooling of the cooling medium, such as water, of an internal combustion engine of the power plant of the motor vehicle, and it is the primary object of the invention to provide a radiator of this character which is of extreme simplicity in structure, cheapness in cost of manufacture and highly efficient in operation.

Liquid cooling radiators for this purpose comprise a pair of tanks, one of which has an inlet adapted to be connected to the outlet of the water jacket of an engine and also provided with a filler opening, and the other tank having an outlet connected to the inlet of the water jacket of the engine, said tanks being connected in circulation by passages to conduct the water from one tank to the other in thin streams and the water being cooled as it flows through such passages by dissipating the heat to the atmosphere. It is the principal object of the present invention to provide an improved construction and arrangement of passages to connect the tanks in circulation to facilitate the cooling of the water in its passage from one tank to the other.

It is a further object of the invention to provide a radiator of this character in which the liquid conducting passages comprise conduits of triangular shape in cross section arranged with a flat side in a plane parallel with the front of the radiator and the other walls converging toward the rear of the radiator to provide passages having a broadened face at the front of the radiator for the impingement of the air and the cross sectional area of which gradually diminish toward the rear of the radiator.

It is another object of the invention to provide the conduits with corrugated members to lie adjacent the conduit to facilitate the radiation and dissipation of the heat, the corrugations of such members extending from the front to the rear of the radiator and inclining downward to direct the cooling air in its passage through the spaces between the passages in a downward direction.

It is a further object of the invention to arrange the liquid conducting passages in a radiator of this character in a series of rows, one forward of the other, with a flat wall of the conduits in the successive rows of conduits extending in a plane parallel with the front of the radiator and the other walls converging toward the rear whereby to direct the air from a forward conduit to the next adjacent rear conduit.

With the above and other objects and advantages as will hereinafter appear the invention comprises the novel features of construction, combination of elements and arrangement of parts hereinafter more fully set forth.

In the drawing accompanying and forming a part of this specification, Figure 1 is a sectional front elevation of a liquid cooling radiator constructed in accordance with my invention.

Similar characters of reference designate like parts throughout the different views of the drawing.

Figure 1:
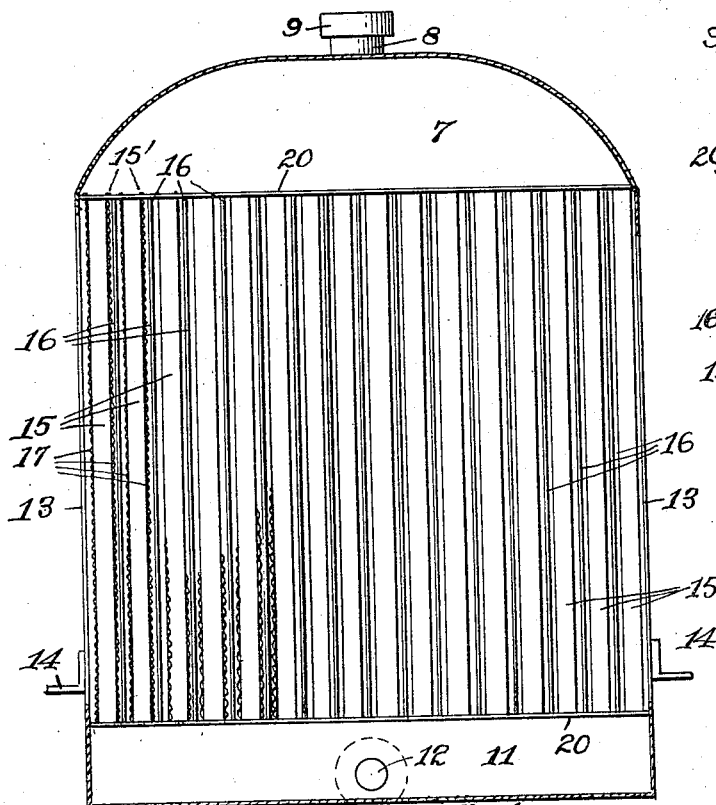

The embodiment of my invention shown in the drawing comprises a tank 7 for the liquid to be cooled having a filler opening in an upwardly projecting portion 8 having a removable closure 9, said tank also having an inlet for the liquid to be cooled arranged to be connected with the outlet of the water jacket of an internal combustion engine (not shown), and a tank 11 having an outlet 12 arranged for connection with the inlet of the jacket of the engine. The tanks are supported in superposed and spaced relation by side members 13 to provide an open frame structure, and the side members have brackets 14 fixed thereto to mount the radiator in position upon the chassis frame of a motor vehicle.

Figure 2:
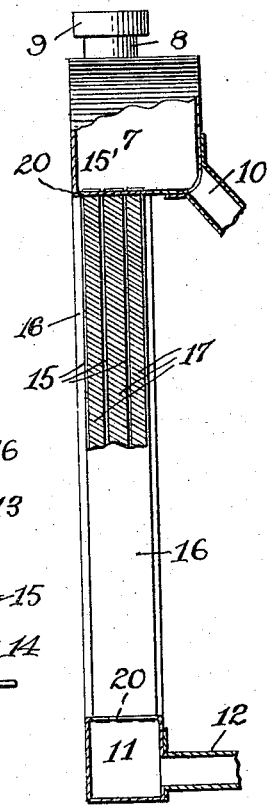
Figure 2 is a side elevation, partly in section, to show the arrangement of the liquid conducting passages and the arrangement of the corrugated members applied thereto.
Figure 3:
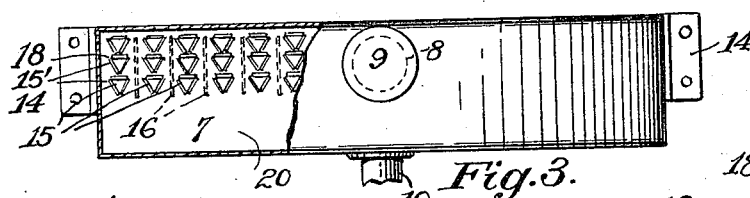
Figure 3 is a plan view, partly in section, to show the arrangement of the liquid conducting conduits and the connection thereof with the tanks of the radiator.
Figure 4:
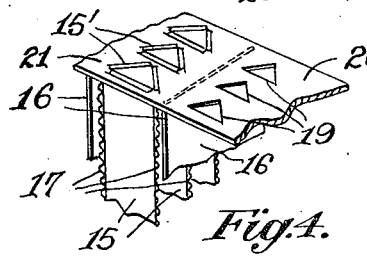
Figure 4 is a fragmentary view in perspective of a portion of a radiator to show the connection of the liquid conducting conduits with the tanks.
Figures 5, 6:
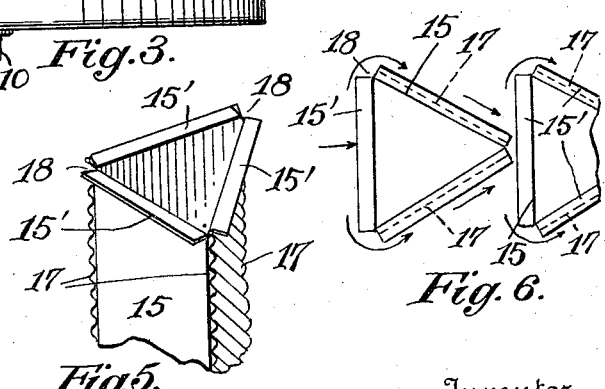
Figure 5 is an enlarged view in perspective of the upper portion of a conduit to show the construction thereof to secure the same to the tanks and the arrangement of the corrugated members relative to the conduits.
Figure 6 is a plan view of a pair of conduits to illustrate the arrangement of the tubes of the successive rows.

The tanks 7 and 11 are connected in circulation by passages to conduct the liquid from the tank 7 to the tank 11 in thin streams to facilitate the cooling of the liquid in its passage from one tank to the other by radiation and dissipating of the heat into the atmosphere. These passages comprise vertically arranged conduits 15. It has been demonstrated that the force with which the air strikes or impinges against an object is an important factor in the cooling of such object by the air. For this purpose the conduits 15 are of such cross sectional shape and connected to the tanks in such a way as to present a broadened face extending in a plane parallel with the front of the radiator for the impingement of the air and to gradually diminish in size toward the rear of the radiator. For this purpose the conduits are made of triangular shape in cross section, as clearly shown in Figures 3 to 6, and arranged in a row in spaced relation extending transversely of the radiator, and shown in the present instance as consisting of three rows, with the conduits of one row arranged directly in the rear of an adjacent forward conduit, as shown in Figures 2 and 3. The conduits of each row of conduits are arranged with a flat wall or face to extend in a plane parallel with the front of the radiator with the other walls converging toward the rear of the radiator. By this arrangement as the air strikes the front walls of the conduits of the forward row it will flow around the lateral edges of the front faces to the side faces of the conduits and by the latter it will be directed to the front faces of the next adjacent rear conduits, as indicated by the arrows in Figure 6. To further facilitate this flow of air partitions 16 are provided to engage between adjacent conduits of the successive rows as clearly shown in Figures 3 and 4. The forward edges of these partitions 16 preferably extend beyond the front of the conduits to serve as a guard for said conduits.

To facilitate the radiation and dissipation of the heat from the conduits corrugated members 17 are arranged adjacent to the converging walls or faces of the conduits. The corrugations of these members extend diagonally from the front to the rear and incline in a downward direction to direct the flow of the heated air from the front of the conduits to the rear and downward and maintain the temperature of the water in the lower portion of the radiator, which is usually of a much lower temperature than at the upper portion of the conduits, at an even temperature which is very advantageous especially in cold weather.

In the construction of the radiator the conduits are formed to triangular shape in cross section and the opposite ends of the conduits slitted at the corners, as shown at 18. The slitted ends of the conduits are then inserted in triangular openings 19 in plates 20, one of which plates at one end of the conduits constitutes the bottom of the tank 7, and the other plate the top of the tank 11. The end portions of the conduits are then bent over to form flanges 15' to engage the face of the plates, as shown at 21, Figure 4, and are secured in position in a suitable manner, as by brazing or soldering. The other walls of the tanks 7 and 11 are then built up from the plates 20.

While I have shown and described a specific structure and arrangement of parts, it is to be understood that various changes may be resorted to without departing from the scope of the invention, and that portions of the invention may be used without others.

Having thus described my invention, I claim:

1. In a liquid cooling radiator for the purpose specified, a pair of tanks supported in spaced relation, one tank having an inlet and the other an outlet; conduits of triangular shape in cross section to connect said tanks in circulation arranged with one wall of each conduit to extend in a plane parallel with the front of the radiator and the other walls converging to the rear of the radiator; and corrugated members adjacent the converging walls of the conduits.

2. In a liquid cooling radiator for the purpose specified, a pair of tanks supported in spaced relation, one tank having an inlet and the other an outlet; and conduits of triangular shape in cross section to connect said tanks in circulation, said conduits being arranged in rows with the conduits of the successive rows in alinement and arranged with a wall of each conduit of the successive rows extending in a plane parallel with the front of the radiator and the other walls converging toward the rear of the radiator.

3. In a liquid cooling radiator for the purpose specified, a pair of tanks one having an inlet and the other an outlet, and conduits to connect said tanks in circulation arranged in rows one row forwardly of the other, and each conduit having a broadened face to extend in parallel relation with the front of the radiator to provide a wide face for the impingement of the air and gradually diminishing in cross sectional area toward the rear of the radiator to direct the air from a tube in the forward row to a broadened face of a tube in a row at the rear.

4. In a liquid cooling radiator for the purpose specified, a pair of tanks supported in spaced relation, one tank having an inlet and the other an outlet; conduits of triangular shape in cross section to connect said tanks in circulation arranged with one wall of each conduit to extend in a plane parallel with the front of the radiator and the other walls converging to the rear of the radiator; and corrugated members adjacent the converging walls of the conduits with the corrugations extending diagonally from the front to the rear of the radiator and inclining downward.

5. In a liquid radiator for the purpose specified, a pair of tanks, partitions extending between said tanks, passages in said partitions to connect the tanks in circulation, each of said passages having a broadened face to extend in a plane parallel with the front of the radiator and gradually diminishing in cross sectional area toward the rear of the radiator for the purpose specified.

6. In a liquid cooling radiator for the purpose specified, a pair of tanks, partitions extending between the tanks, conduits to connect said tanks in circulation between said partitions, said conduits being of triangular shape in cross section arranged with a broadened face of each conduit extending in a plane parallel with the front of the radiator and the other walls converging toward the rear of the radiator.

7. In a liquid cooling radiator for the purpose specified, a pair of tanks, partitions extending between the tanks, conduits to connect said tanks in circulation between said partitions, said conduits being of triangular shape in cross section arranged with a flattened face of each conduit extending in a plane parallel with the front of the radiator and the other walls converging toward the rear of the radiator, and corrugated members arranged at the converging sides of the tubes, the corrugations extending diagonally from the front to the rear and inclining in a downward direction for the purpose specified.

8. In a liquid cooling radiator for the purpose specified, a pair of tanks, a series of partitions extending between the tanks, and a series of conduits between a pair of partitions one forward of the other connected at opposite ends to the tanks, said conduits having a broadened face to extend in a direction parallel with the front of the radiator and with the cross sectional area of the tubes gradually diminishing from the broadened faces toward the rear for the purpose specified.

9. In a liquid cooling radiator for the purpose specified, a pair of tanks, a series of partitions extending between the tanks, and a series of conduits between a pair of partitions one forward of the other, said conduits being of triangular shape in cross section with one face of each conduit extending in a plane parallel with the front of the radiator and the other faces converging toward the rear for the purpose specified.

10. In a liquid cooling radiator for the purpose specified, a pair of tanks, a series of partitions extending between the tanks, a series of conduits between a pair of partitions one forward of the other, said conduits being of triangular shape in cross section with one wall of each conduit extending in a plane parallel with the front of the radiator and the other walls converging toward the rear, and corrugated members arranged at the sides of the conduits with the corrugations extending diagonally from the front to the rear of the radiator and inclining downward for the purpose specified.

Signed at the city of Detroit, in the county of Wayne, and State of Michigan, this 22nd day of March, 1920.

EDWARD T. CURRAN.